(12) United States Patent
Shinozaki et al.

(10) Patent No.: US 11,187,527 B2
(45) Date of Patent: Nov. 30, 2021

(54) MULTI-PROBE NON-DESTRUCTIVE INSPECTION SYSTEM

(71) Applicant: The Boeing Company, Chicago, IL (US)

(72) Inventors: John M. Shinozaki, Kenmore, WA (US); Barry A. Fetzer, Renton, WA (US)

(73) Assignee: The Boeing Company, Chicago, IL (US)

( * ) Notice: Subject to any disclaimer, the term of this patent is extended or adjusted under 35 U.S.C. 154(b) by 106 days.

(21) Appl. No.: 16/595,094

(22) Filed: Oct. 7, 2019

(65) Prior Publication Data
US 2021/0102803 A1 Apr. 8, 2021

(51) Int. Cl.
*G01B 21/20* (2006.01)
*G01B 21/30* (2006.01)

(52) U.S. Cl.
CPC ............ *G01B 21/20* (2013.01); *G01B 21/30* (2013.01)

(58) Field of Classification Search
CPC .............. G01B 21/20; G01B 21/30; G01N 2291/2693; G01N 2291/2694; G01N 29/265; G01N 29/225
See application file for complete search history.

(56) References Cited

U.S. PATENT DOCUMENTS

| 6,378,387 B1 * | 4/2002 | Froom ............... G01M 5/0016 73/865.8 |
| 8,264,219 B2 * | 9/2012 | Gibson .................. F16L 55/30 324/220 |
| 9,127,971 B2 | 9/2015 | Sarr et al. |
| 9,395,339 B2 | 7/2016 | Sarr et al. |

(Continued)

FOREIGN PATENT DOCUMENTS

| CN | 203465957 | * | 3/2014 | ............. Y02E 30/30 |
| CN | 107962383 A | * | 4/2018 | ............ B23P 21/004 |

(Continued)

OTHER PUBLICATIONS

Hayato Yoshioka, a newly developed rotary-linear motion platform with a giant magnetostrictive actuator, CIRP Annals—Manufacturing Technology 62 (2013) 371-374 (Year: 2013).*

(Continued)

*Primary Examiner* — Tung S Lau
(74) *Attorney, Agent, or Firm* — Kunzler Bean & Adamson

(57) ABSTRACT

Disclosed herein is a non-destructive inspection system. The non-destructive inspection system comprises a motion platform and a tool assembly. The tool assembly is coupled to the motion platform such that the tool assembly is movable relative to the motion platform. The tool assembly comprises an inspection tool assembly that comprises a base structure coupled to the tool assembly and a plurality of probe assemblies coupled to the base structure. Each probe assem- (Continued)

bly comprises a first linear actuator and a probe, different from the probe of any other one of the plurality of probe assemblies, for inspecting a different structural feature of a structure. Each probe is moveable, along a first axis relative to another one of the probes and substantially perpendicular to the base structure, using the first linear actuator of the corresponding one of the plurality of probe assemblies.

20 Claims, 8 Drawing Sheets

(56) References Cited

U.S. PATENT DOCUMENTS

| | | | | |
|---|---|---|---|---|
| 9,708,079 | B2 * | 7/2017 | DesJardien | B25J 9/0018 |
| 9,740,191 | B2 | 8/2017 | Troy et al. | |
| 9,933,396 | B2 | 4/2018 | Fetzer et al. | |
| 10,814,480 | B2 * | 10/2020 | Georgeson | B25J 9/1015 |
| 2013/0180450 | A1 * | 7/2013 | Hamilton | H05K 13/00 |
| | | | | 118/697 |
| 2015/0314436 | A1 * | 11/2015 | Reid | B23B 41/00 |
| | | | | 414/800 |
| 2016/0274066 | A1 * | 9/2016 | Motzer | G01N 29/221 |
| 2017/0312821 | A1 * | 11/2017 | DeFelice | B23K 26/0093 |
| 2019/0302062 | A1 | 10/2019 | Fetzer et al. | |
| 2019/0360973 | A1 | 11/2019 | Young et al. | |

FOREIGN PATENT DOCUMENTS

| | | | | |
|---|---|---|---|---|
| CN | 108127286 A | * | 6/2018 | B23K 31/02 |
| CN | 209394657 U | * | 9/2019 | B25J 5/00 |
| EP | 3238865 A1 | * | 11/2017 | B22F 3/1055 |
| JP | 57176016 | | 10/1982 | |
| JP | 3125966 | | 5/1991 | |

OTHER PUBLICATIONS

B. Alexander Cope, A Robotic Platform for Internal Inspection, Nov. 22, 2012, 130 pages (Year: 2012).*
Webjørn Rekdalsbakken, The Use of Artificial Intelligence in Controlling a 6DOF Motion Platform, © ECMS 2007, 6 pages (Year: 2007).*
ZacharyWachter, A Cost Effective Motion Platform for Performance Testing of MEMS-Based Attitude and Heading Reference Systems, Aug. 23, 2012, 9 pages (Year: 2012).*
M. Almonacid, Motion Planning of a Climbing Parallel Robot, IEEE Transactions on Robotics and Automation, vol. 19 , No. 3, Jun. 2003, 5 pages (Year: 2003).*
U.S. Appl. No. 16/252,842, filed Jan. 21, 2019.
U.S. Appl. No. 16/437,239, filed Jun. 11, 2019.
U.S. Appl. No. 16/796,280, filed Feb. 20, 2020.
U.S. Appl. No. 16/717,037, filed Dec. 17, 2019.
https://www.youtube.com/watch?v=EqYVZ3MJ5ts, accessed Oct. 7, 2019.
Extended European Search Report concerning European Patent Application No. 20190387.9 dated Feb. 5, 2021.
IBM 3495 Promotional Video accessed from https://www.youtube.com/watch?v=GwMn7YpF8r8 on May 25, 2021.

* cited by examiner

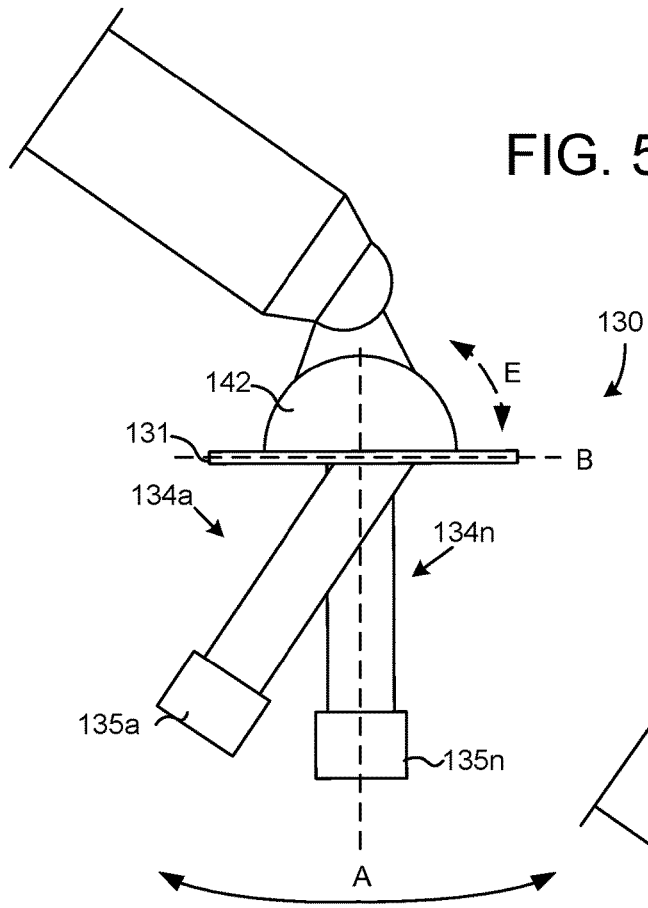
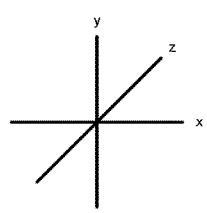
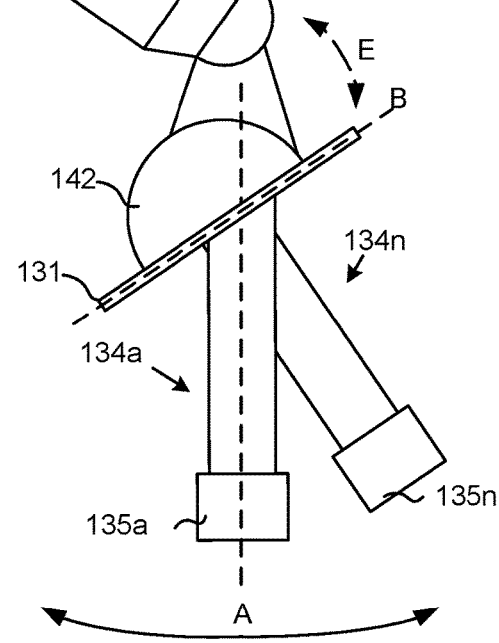
FIG. 5A
FIG. 5B

MULTI-PROBE NON-DESTRUCTIVE INSPECTION SYSTEM

FIELD

This disclosure relates generally to inspection systems for inspecting parts, and more particularly to a multi-probe non-destructive inspection system.

BACKGROUND

Inspecting or scanning structures, in a non-destructive manner, uses different probes for scanning on the surface of the structure. Different probes can be configured to scan different surface topologies. In conventional systems, different probes of different sizes are mounted, used, and removed, one at a time, from a motion platform based on the structural features and/or surface topologies of a structure that is being inspected. Constantly mounting and removing probes to/from a motion platform can be time consuming.

SUMMARY

The subject matter of the present application has been developed in response to the present state of the art, and in particular, in response to the problems and disadvantages associated with conventional inspection systems. Accordingly, the subject matter of the present application has been developed to inspect various structures using a non-destructive inspection approach that overcomes at least some of the above-discussed shortcomings of prior art techniques.

Disclosed herein is a non-destructive inspection system. The non-destructive inspection system comprises a motion platform and a tool assembly. The tool assembly is coupled to the motion platform such that the tool assembly is movable relative to the motion platform. The tool assembly comprises an inspection tool assembly that comprises a base structure coupled to the tool assembly and a plurality of probe assemblies coupled to the base structure. Each probe assembly comprises a first linear actuator and a probe, different from the probe of any other one of the plurality of probe assemblies, for inspecting a different structural feature of a structure. Each probe is moveable, along a first axis relative to another one of the probes and substantially perpendicular to the base structure, using the first linear actuator of the corresponding one of the plurality of probe assemblies. The preceding subject matter of this paragraph characterizes example 1 of the present disclosure.

The inspection tool assembly further comprises a second linear actuator coupled to the base structure and each of the plurality of probe assemblies. The second linear actuator is configured to move the plurality of probe assemblies along a second axis substantially perpendicular to the first axis. The preceding subject matter of this paragraph characterizes example 2 of the present disclosure, wherein example 2 also includes the subject matter according to example 1, above.

The non-destructive inspection system further comprises a controller that is configured to actuate the first linear actuators to position one of the plurality of probes into a scanning position and to position the other probes into a non-scanning position. The preceding subject matter of this paragraph characterizes example 3 of the present disclosure, wherein example 3 also includes the subject matter according to example 2, above.

The first axis passes through a reference point of the tool assembly. The one of the plurality of probe assemblies in the scanning position is aligned with the reference point such that the first axis passes through the one of the plurality of probe assemblies. The other probe assemblies in the non-scanning position are not aligned with the reference point such that the first axis does not pass through the other probe assemblies. The preceding subject matter of this paragraph characterizes example 4 of the present disclosure, wherein example 4 also includes the subject matter according to example 3, above.

The first axis passes through a reference point of the tool assembly. An offset of the position of the one of the plurality of probe assemblies, that is positioned in the scanning position, relative to the reference point is determined for scanning. The preceding subject matter of this paragraph characterizes example 5 of the present disclosure, wherein example 5 also includes the subject matter according to any one of examples 3-4, above.

Each probe of the plurality of probe assemblies is rotatable about a first radial axis, parallel to the first axis, and is rotatable about a second radial axis, substantially perpendicular to the first axis and the first radial axis. The preceding subject matter of this paragraph characterizes example 6 of the present disclosure, wherein example 6 also includes the subject matter according to any one of examples 1-5, above.

A probe assembly of the plurality of probe assemblies comprises a plurality of probes. While at least another of the plurality of probe assemblies is in a non-scanning position, the plurality of probes configured to scan the structure simultaneously when the probe assembly is in a scanning position. The preceding subject matter of this paragraph characterizes example 7 of the present disclosure, wherein example 7 also includes the subject matter according to any one of examples 1-6, above.

The non-destructive inspection system further comprises one or more sensors. A probe assembly of the plurality of probe assemblies is selected to be in a scanning position and another probe assembly of the plurality of probe assemblies is selected to be in a non-scanning position based on data about the structure captured using the one or more sensors. The preceding subject matter of this paragraph characterizes example 8 of the present disclosure, wherein example 8 also includes the subject matter according to any one of examples 1-7, above.

The plurality of probe assemblies comprises a first probe assembly that comprises a first probe for scanning substantially even areas of the structure and a second probe assembly that comprises a second probe for scanning uneven areas of the structure. The preceding subject matter of this paragraph characterizes example 9 of the present disclosure, wherein example 9 also includes the subject matter according to any one of examples 1-8, above.

Further disclosed herein is a method of scanning a structure using a non-destructive inspection system. The method comprises moving a first probe assembly of an inspection tool assembly of a tool assembly out of a scanning position. The first probe assembly comprises one or more probes for inspecting first structural features of the structure. The method also comprises moving a second probe assembly of the inspection tool assembly into the scanning position. The second probe assembly comprises one or more probes for inspecting second structural features of the structure. The second structural features are of a different type than the first structural features. The method of scanning a structure using a non-destructive inspection system further comprises scanning the structure using the one or more probes of the second probe assembly. The preceding subject matter of this paragraph characterizes example 10 of the present disclosure.

The step of moving the first probe assembly out of the scanning position comprises actuating a linear actuator coupled to the first probe assembly, along a first axis in a first direction. The step of moving the second probe assembly into the scanning position comprises actuating a linear actuator coupled to the second probe assembly, along the first axis in a second direction opposite the first direction. The preceding subject matter of this paragraph characterizes example 11 of the present disclosure, wherein example 11 also includes the subject matter according to example 10, above.

The method further comprises actuating a second linear actuator, coupled to the first probe assembly and the second probe assembly, along a second axis, substantially perpendicular to the first axis, to further move the first probe assembly out of the scanning position and the second probe assembly into the scanning position. The preceding subject matter of this paragraph characterizes example 12 of the present disclosure, wherein example 12 also includes the subject matter according to example 11, above.

The first axis passes through a reference point of the tool assembly. The first axis passes through the second probe assembly when in the scanning position. The preceding subject matter of this paragraph characterizes example 13 of the present disclosure, wherein example 13 also includes the subject matter according to example 12, above.

The method further comprises determining an offset of the scanning position of the second probe assembly along the second axis in relation to a reference point of the tool assembly. The preceding subject matter of this paragraph characterizes example 14 of the present disclosure, wherein example 14 also includes the subject matter according to any one of examples 12-13, above.

Moving the first probe assembly out of the scanning position and moving the second probe assembly into the scanning position comprises actuating a radial actuator coupled to the inspection tool assembly about a radial axis, where the first probe assembly and the second probe assembly are non-movably fixed to the inspection tool assembly and are offset from each other. The preceding subject matter of this paragraph characterizes example 15 of the present disclosure, wherein example 15 also includes the subject matter according to any one of examples 10-11, above.

Moving the first probe assembly out of the scanning position and moving the second probe assembly into the scanning position comprises actuating a first radial actuator coupled to the first probe assembly and actuating a second radial actuator coupled to the second probe assembly. The preceding subject matter of this paragraph characterizes example 16 of the present disclosure, wherein example 16 also includes the subject matter according to any one of examples 10-11, above.

The method further comprises dynamically selecting one of the first probe assembly or the second probe assembly to move into the scanning position based on structural features of the structure to be inspected and one of one or more probes of the first probe assembly and one or more probes of the second probe assembly. The preceding subject matter of this paragraph characterizes example 17 of the present disclosure, wherein example 17 also includes the subject matter according to any one of examples 10-16, above.

The method further comprises receiving a plurality of data sets, at a computing device, that the one or more probes of the first probe assembly and the one or more probes of the second probe assembly capture, the plurality of data sets describing various structural features of the structure. The method also comprises generating a single scan of the structure based on the plurality of data sets. The preceding subject matter of this paragraph characterizes example 18 of the present disclosure, wherein example 18 also includes the subject matter according to any one of examples 10-17, above.

Additionally, disclosed herein is a non-destructive inspection system. The non-destructive inspection system comprises a motion platform and a tool assembly. The tool assembly is coupled to the motion platform such that the tool assembly is movable relative to the motion platform. The tool assembly comprises an inspection tool assembly that comprises a plurality of probe assemblies. Each probe assembly comprises a different probe for inspecting different structural features of a structure. The plurality of probe assemblies is rotatable about an axis using a radial actuator to move at least one of the plurality of probe assemblies into a scanning position. The preceding subject matter of this paragraph characterizes example 19 of the present disclosure.

The radial actuator is coupled to the inspection tool assembly to move the inspection tool assembly in a radial direction or a plurality of radial actuators each coupled to a corresponding one of the plurality of probe assemblies to individually move each of the plurality of probe assemblies in a radial direction. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIG. 5a is a schematic perspective view of an implementation of another inspection tool assembly of a multi-probe non-destructive inspection system in a first position, according to one or more examples of the present disclosure;

FIG. 5b is a schematic perspective view of the inspection tool assembly of FIG. 5a in a second position, according to one or more examples of the present disclosure;

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
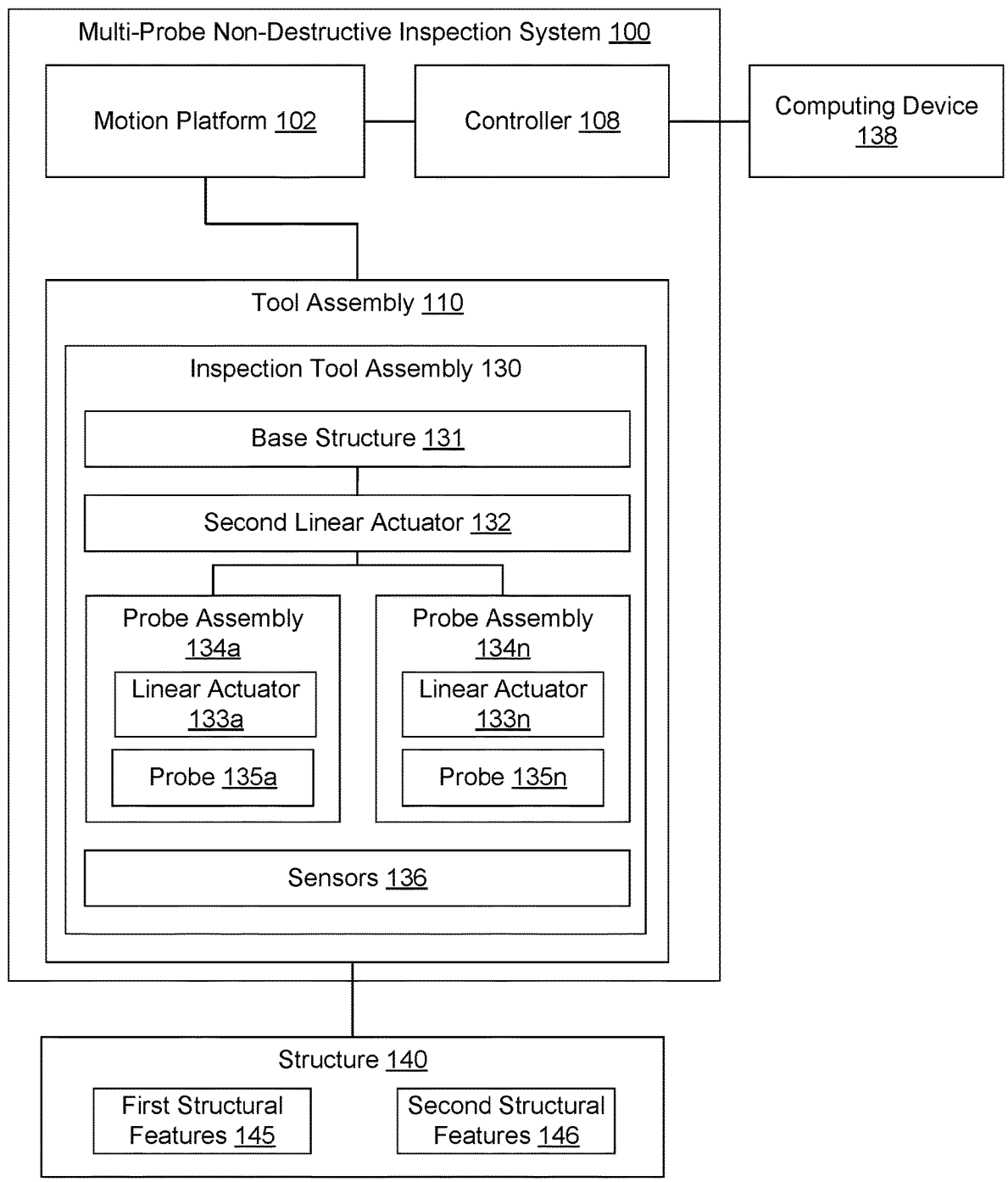
FIG. 1 is a schematic block diagram of a multi-probe non-destructive inspection system, according to one or more examples of the present disclosure.

Referring to FIG. 1, according to some examples, disclosed herein is a multi-probe non-destructive inspection system 100 for inspecting internal and external surfaces of a structure 140 (e.g., a part or object). In the illustrated examples, the system 100 includes a motion platform 102, such as a robot, a vertical or horizontal gantry, or the like, and a tool assembly 110, such as an end effector, coupled to the motion platform 102. An inspection tool assembly 130 is coupled to the tool assembly 110. The tool assembly 110 is movable by the motion platform 102, relative to the motion platform 102, to move the inspection tool assembly 130.

An inspection tool assembly 130 is coupled to the tool assembly 110. The inspection tool assembly 130 includes a plurality of probe assemblies 134a-n. The probe assemblies 134a-n, in certain examples, include first linear actuators 133a-n for moving probes 135a-n along a linear axis, such as a linear axis that is parallel to vertical axis A (see, e.g., FIG. 4a). The probes 135a-n are configured to scan an external surface of a structure 140, internal components of the structure 140, and/or the like using various scanning devices, such as sensors. The structure 140, for example, may be a wing of an aircraft, a door of an automobile, a structure of a machine or robot, and/or the like. Examples of structures 140 of an aircraft to be inspected include vent stringers, blade stringers, and/or the like. The probes 135a-n may be of different sizes, types, configurations, and/or the like, which may be determined based on the type of structure 140 that is being inspected.

Figure 4A:
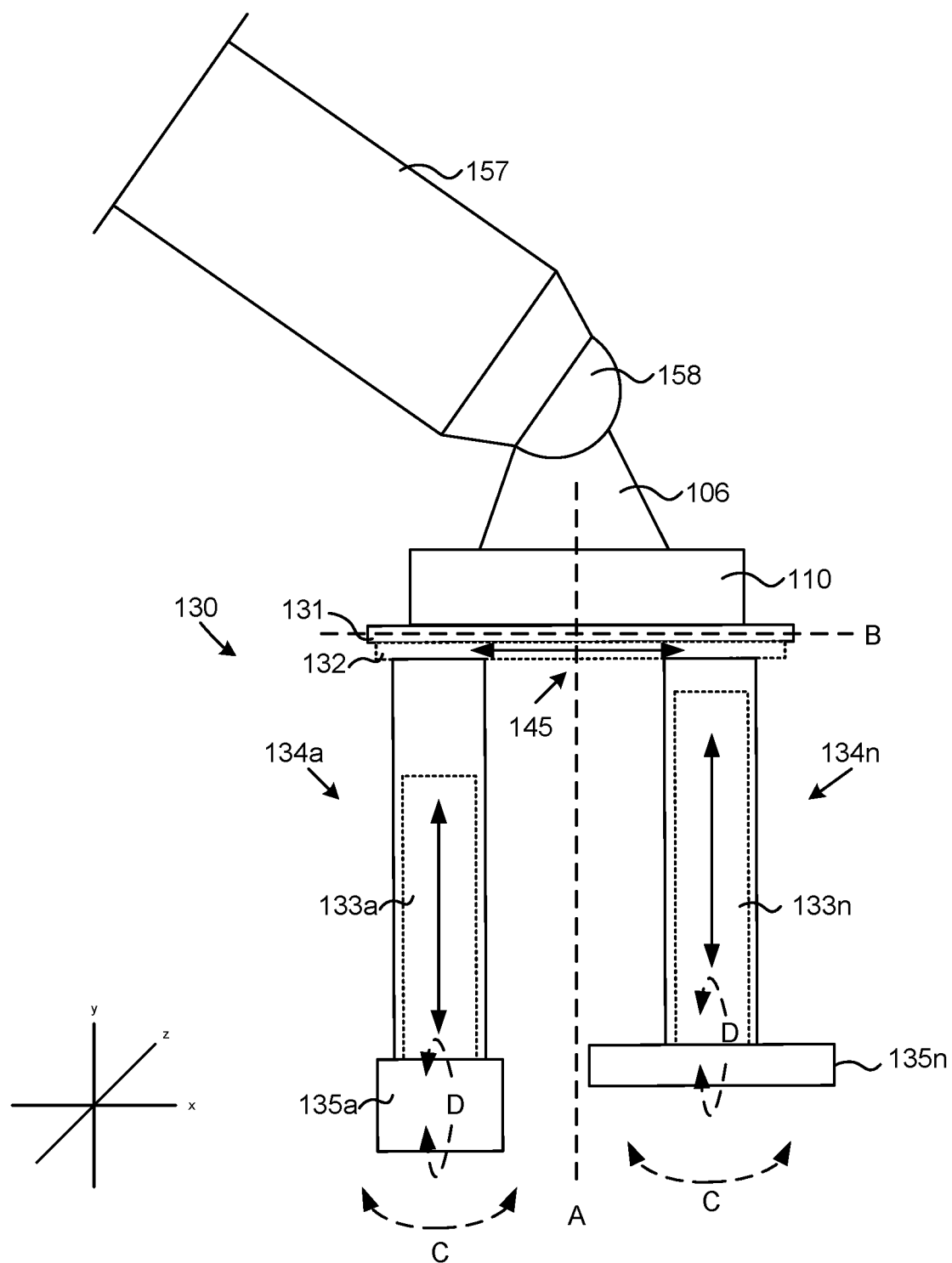
FIG. 4a is a schematic perspective view of an implementation of an inspection tool assembly of a multi-probe non-destructive inspection system, according to one or more examples of the present disclosure.

The inspection tool assembly 130 further includes, in some examples, a second linear actuator 132 that is configured to move the probe assemblies 134a-n in a direction that is substantially perpendicular to the direction that the first linear actuators 133a-n move the probes 135a-n (e.g., a direction parallel to axis B as shown in FIG. 4a). The second linear actuator 132 is coupled to a base structure 131, which is coupled to the tool assembly 110. Each of the first linear actuators 133a-n and second linear actuator 132 can be an electrical actuator, a pneumatic actuator, a hydraulic actuator, and/or the like.

The inspection tool assembly 130 further includes sensors 136 for capturing data about the structure 140 that can be used to assist in navigating the probes 135a-n around the structure, such as for making decisions about which probes 135a-n to use, and/or the like. In some implementations, sensors 136 may be part of the tool assembly 110 and/or the motion platform 102, in addition to or in place of the sensors 136 of the inspection tool assembly 130. Sensors 136 may also be located in the base structure 131, the probe assemblies 134a-n, and/or the probes 135a-n.

The sensors 136, in some examples, include, proximity sensors, accelerometers, gyroscopes, motion sensors, capacitance sensors, touch sensors, light sensors, sonar sensors, laser sensors, potentiometers, and/or the like. The sensor data, in certain examples, is used to select one of the probes 135a-n, and the corresponding one of the probe assemblies 134a-n, to be used to scan the structure 140. For example, the probes 135a-n may each be configured to scan or otherwise inspect different types of surfaces, structures, components, or the like. Based on the structure 140 that is being inspected, different probes 135a-n may be better suited for inspecting the structure 140, or a portion of the structure 140.

Thus, during inspection, probes 135a-n can be dynamically selected and moved into and out of a scanning position relative to the inspection tool assembly 130 based on different characteristics or features 145-146 of the structure 140 to be scanned. Even though two probes 135a-n are depicted in FIG. 1, each corresponding with a given one of the probe assemblies 134a-n, each one of the probe assemblies 134a-n may include any number of probes 135a-n. For instance, in an example shown in FIG. 4b, a probe assembly 134a includes two probes 135a-b. The two probes 135a-b within a single probe assembly 134a can be positioned and configured to scan a given structural feature of a structure 140.

Further, even though two probe assemblies 134a-n are depicted in FIG. 1, the inspection tool assembly 130 may include any number of probe assemblies 134a-n. For instance, in an example, the inspection tool assembly 130 includes three probe assemblies 134a-n. In another example, the inspection tool assembly 130 includes four probe assemblies 134a-n, and so on.

In some examples, the probes 135a-n are automatically selected based on input from the sensors 136, as described above. In other examples, the probes 135a-n may be selected based on input from a machine, e.g., computing system 138 or a user. For example, a computing device 138 coupled to the multi-probe non-destructive inspection system 100 may have a diagram, figure, schematic, illustration, model, or the like of the structure 140 that is being inspected (e.g., a computer-aided design ("CAD") model, or the like) and based on the location of the inspection tool assembly 130 relative to the structure 140 and the current probe of the probes 135a-n that is being used to scan the structure 140, the computing device 138 may command the inspection tool assembly 130 to select a different one of the probe assemblies 134a-n that is configured to scan or inspect the portion of the structure 140 that is being inspected. Similarly, a user may provide a manual command to the tool assembly 110 to select a different one of the probes 135a-n.

In further examples, the multi-probe non-destructive inspection system 100 may be configured to dynamically switch or interchange probe assemblies 134a-n from a probe assembly 134a-n receptacle (not shown) that includes different probe assemblies 134a-n that include different probes 135a-n, each configured to scan or inspect different characteristics, structural features 145-146, or the like of the structure 140 based on the location of the inspection tool assembly 130 relative to the structure 140. The structural characteristics or features 145-146 of the structure may include joggles, valleys, uneven surfaces, bumps, corners (inside and outside), pad-ups, and/or the like. The structural characteristics or features 145-146 can also include structural stiffeners that are I-shaped, blade-shaped, z-shaped, hat-shaped, and/or the like.

In some examples, the tool assembly 110 is operably coupled with a controller 108 to receive operational commands from the controller 108 and to operate in accordance with the operational commands. The operational commands can include direction commands, direction amount commands, and/or speed commands. The operational commands can also include commands to change the current probe of the probes 135a-n to a different one of the probes 135a-n, commands to change the position of the probes 135a-n, commands to switch out a probe of the probes 135a-n for a different one of the probes 135a-n, commands to rotate the probes 135a-n, and/or the like.

The controller 108 and/or the computing device 138 receives one or more data sets including data that is captured using the probes 135a-n and that describes the structural features of the structure 140. For instance, each one of the probes 135a-n may capture and generate its own data set for the structural features of the structure 140 that the one of the probes 135a-n inspects, scans, or the like. The data sets may be combined, aggregated, and/or the like, at the computing device 138, to generate a single scan, image, model, and/or the like of the structure 140 based on the different data sets.

In certain embodiments, motion simulation software can be used to simulate the positions and paths of the probes 135a-n, including the position of the motion platform 102 and the tool assembly 110, based on different parameters, which may be determined based on previous scans, input from the sensors 136, user-provided input, and/or the like. In this manner, the physical movement of the motion platform 102, tool assembly 110, inspection tool assembly 130, probe assemblies 134a-n, and probes 135a-n can be simulated, the result of which may be used to direct and refine the motion of the motion platform 102 while scanning the structure 140.

Figure 2:
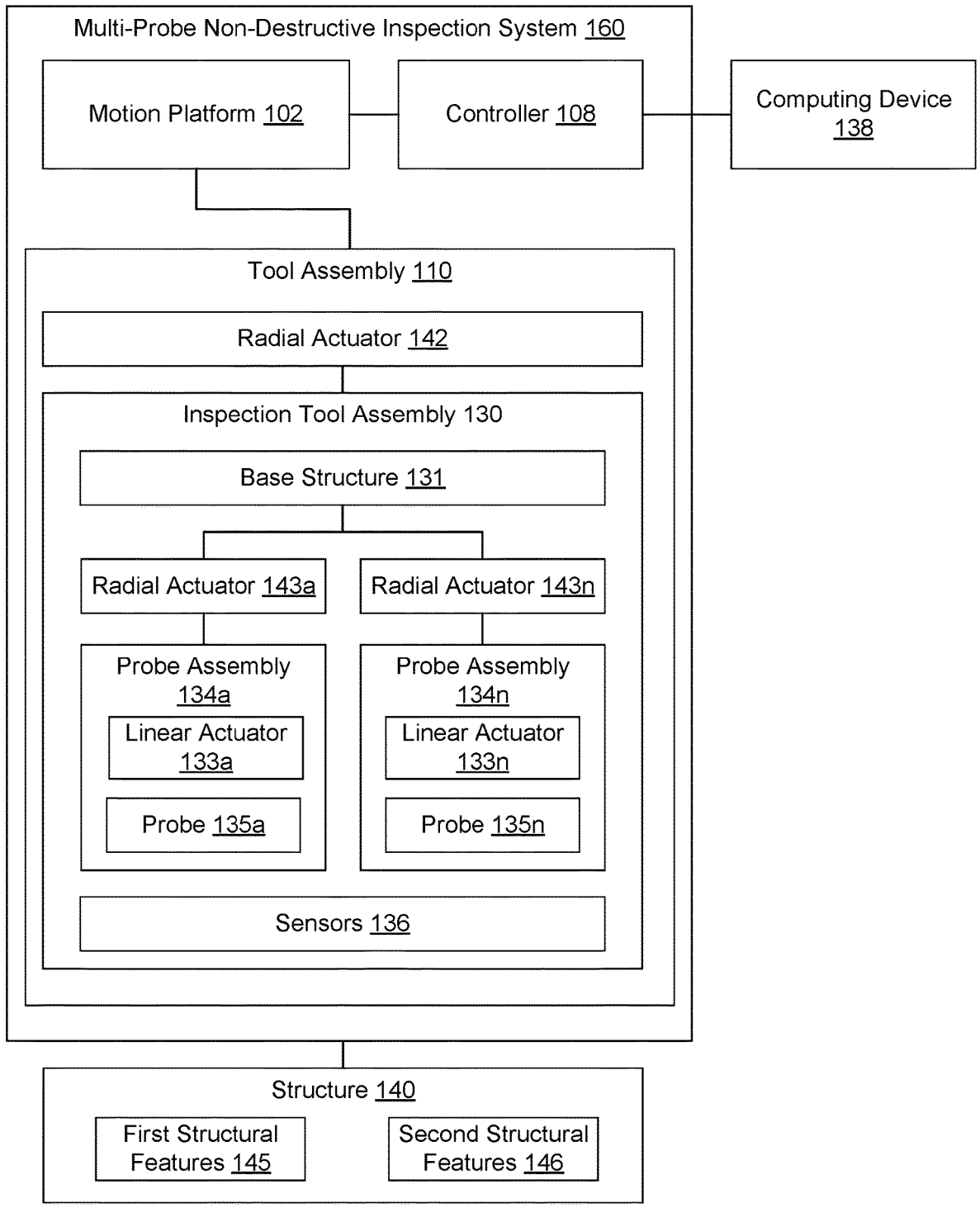
FIG. 2 is a schematic block diagram of another multi-probe non-destructive inspection system, according to one or more examples of the present disclosure.

Referring to FIG. 2, according to some examples, disclosed herein is a multi-probe non-destructive inspection system 160 for inspecting internal and external surfaces of a structure 140. The example embodiment illustrated in FIG. 2 may be substantially similar to the example embodiment described above with reference to FIG. 1. In further examples, the multi-probe non-destructive inspection system 160 illustrated in FIG. 2 includes a radial actuator 142 that is coupled to the tool assembly 110 and the inspection tool assembly 130. The radial actuator 142 is configured to move the inspection tool assembly 130 radially to move the probes 135a-n into and out of a scanning position in a radial direction along a radial axis while scanning a structure 140.

In some embodiments, the multi-probe non-destructive inspection system 160 includes radial actuators 143a-n that are coupled to the base structure 131 and each one of the probe assemblies 134a-n for individually moving each of the probe assemblies 134a-n into and out of a scanning position in a radial direction along a radial axis while scanning a structure 140. The radial actuators 142, 143a-n can include mechanical actuators, pneumatic actuators, and/or the like. In some example embodiments, the probe assemblies 134a-n include first linear actuators 133a-n for moving the probes 135a-n along a linear axis while scanning a structure 140.

Figure 3:
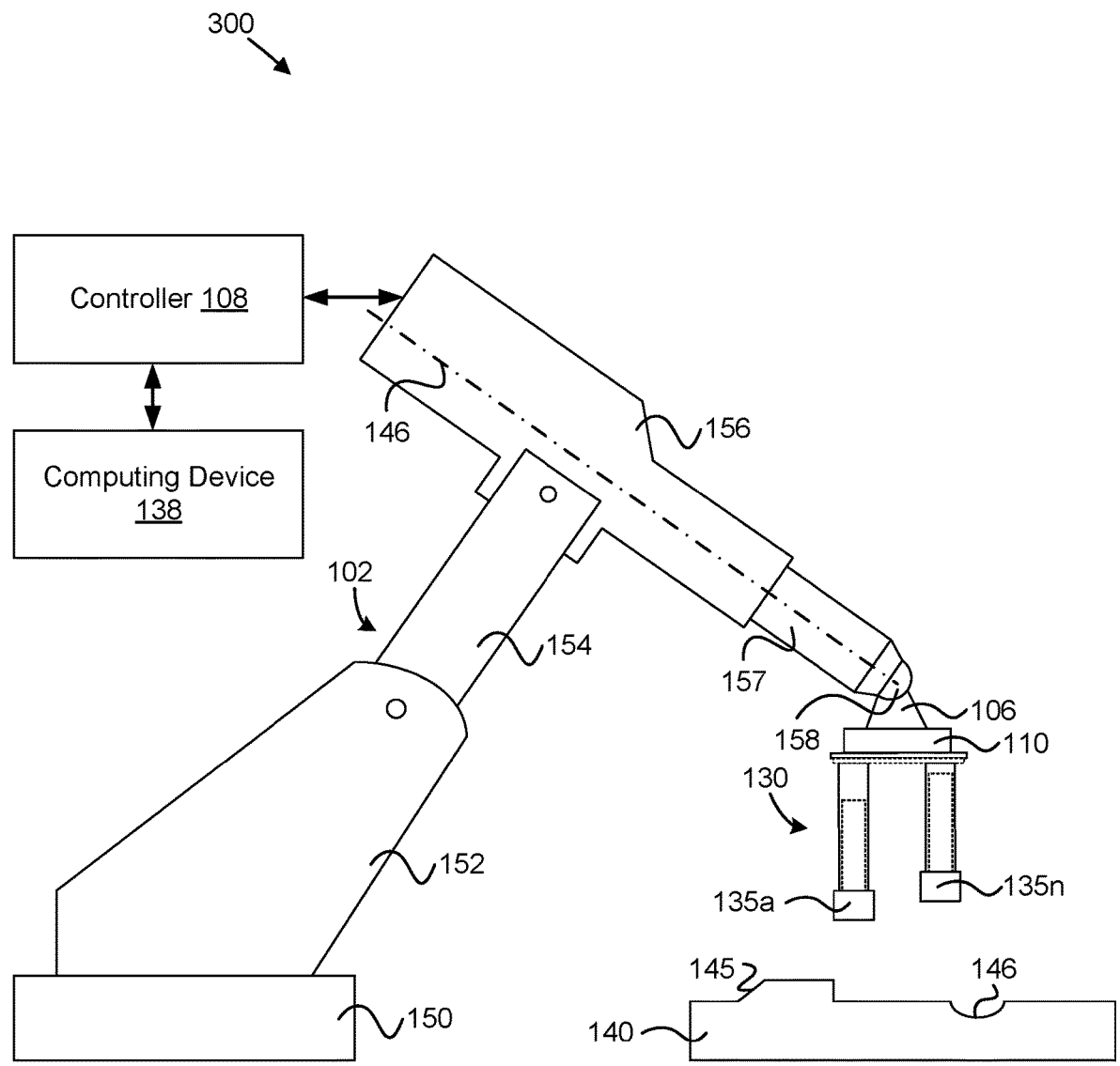
FIG. 3 is a schematic side view of an implementation of a multi-probe non-destructive inspection system, according to one or more examples of the present disclosure.

Referring to FIG. 3, according to some examples, disclosed herein is a multi-probe non-destructive inspection system 300. The motion platform 102 of the multi-probe non-destructive inspection system 300 includes multiple articulating members. In the illustrated examples, the motion platform 102 is a robot that includes a footing 150 and a base 152 that is rotatable relative to the footing 150 about a vertical axis. The motion platform 102 further includes a connecting arm 154 that is pivotable relative to the base 152 about a horizontal axis. The motion platform 102 additionally includes a support arm 156 or supplemental arm that is pivotable relative to the connecting arm 154 about a horizontal axis. The support arm 156 defines a support axis 146 that extends along a length of the support arm 156.

The motion platform 102 further includes an extension arm 157 that is rotatable relative to the support arm 156 about the support axis 146. The motion platform 102 also includes a coupler arm 158 that is pivotable relative to the extension arm 157 about an axis, perpendicular to the support axis 146 of the support arm 156. The motion platform 102 further includes an interface arm 106 that is rotatable about an axis, perpendicular to the axis about which the coupler arm 158 rotates. The tool assembly 110 is coupled directly to the interface arm 106 and is co-movably fixed relative to the interface arm 106. Accordingly, in some examples, the motion platform 102 is a 6-axis robot that facilitates motion of the tool assembly 110 with 6-degrees of freedom. However, in other examples, the motion platform 102 can have fewer or more than 6-degrees of freedom.

In FIG. 3, the motion platform 102 is embodied as a robot; however, in other examples, the motion platform 102 includes a gantry such as a horizontal or vertical gantry, or other like structures. The tool assembly 110, in certain examples, can include an end-effector for interacting with the inspection tool assembly 130. The inspection tool assembly 130 includes a plurality of probes 135a-n for scanning various structural features 145-146 of a structure 140 for a non-destructive inspection. The structural features, in some examples, include bumps/hills 145, valleys 146, and/or the like, which may necessitate the use of different types of probes 135a-n, probes 135a-n that have different shapes or sizes, probes 135a-n that have different sensors or sensor configurations, and/or the like.

The tool assembly 110 is movable by the motion platform 102, relative to the motion platform 102, to move the inspection tool assembly 130 into a position for scanning a structure 140. For instance, the various components of the motion platform 102 such as the support arm 156, the extension arm 157, the coupler arm 158, and the interface arm 106 are movable to position the inspection tool assembly 130 into different scanning positions, while the footing 150 remains fixed, for scanning different structural features 145-146 of the structure based on a topography of the structure 140.

The motion platform 102, tool assembly 110, inspection tool assembly 130, and/or the probes 135a-n can be controlled by operational commands received from the controller 108. As explained above, the controller 108 can automatically send, trigger, signal, or the like, operational commands for controlling the motion platform 102, the tool assembly 110, the inspection tool assembly 130, and/or the probes 135a-n, based on feedback from one or more sensors 136 while any one of the probes 135a-n is scanning a structure 140. In other example embodiments, the controller 108 sends operational commands based on input from the computing device 138, from a user, and/or the like.

Referring to FIG. 4a, according to some examples, disclosed herein is an inspection tool assembly 130 coupled to a tool assembly 110, as described above with reference to FIG. 3. The inspection tool assembly 130 includes a base structure 131, which can be a substantially rigid plate or other structure for supporting the first linear actuators 133a-n, probe assemblies 134a-n, and probes 135a-n.

The inspection tool assembly 130, in certain examples, includes a second linear actuator 132 for moving the plurality of probe assemblies 134a-n along a linear axis B. As illustrated in FIG. 4a, the second linear actuator 132 is configured to move in a substantially horizontal direction, left to right, for moving one of the probes 135a-n to a reference point 145 relative to the inspection tool assembly 130, such as the center point of the motion platform 102, the tool assembly 110, and/or the inspection tool assembly 130, when in a scanning position.

Each one of the probe assemblies 134a-n, when in the scanning position, is aligned with the reference point 145 such that the vertical axis A passes through the one of the probe assemblies 134a-n in the scanning position while the vertical axis A does not pass through the other of the probe assemblies 134a-n that are not aligned with the reference point 145. In some example embodiments, the vertical axis A passes through the reference point 145 and an offset of the position of the one of the plurality of probe assemblies 134a-n that is positioned in the scanning position, relative to the reference point 145 is determined (e.g., the controller 108 may track or determine the offset during use).

In this manner, the offset of the position of the scanning one of the probe assemblies 134a-n, and the probe 135a-n, that is in the scanning position relative to the tool assembly 110 and the structure 140 can be determined and used, for example, in a software program such as motion simulation software for specifying the probe 135a-n location and/or probe path parameters, which allows the software to determine how to articulate the robot degrees of freedom to scan the structure 140. The offset may be a measurement, e.g., inches, centimeters, etc., relative to the reference point 145, e.g., the center point of the inspection tool assembly 130, the tool assembly 110, and/or the like.

In further examples, the inspection tool assembly 130 includes a plurality of probe assemblies 134a-n. The probe assemblies 134a-n are coupled to the second linear actuator 132 and/or the base structure 131, and include the first linear actuators 133a-n. The first linear actuators 133a-n are configured to move along a vertical linear axis A in a direction that is substantially perpendicular to the horizontal linear axis B (e.g., the first linear actuators 133a-n of the probe assemblies 134a-n may not be exactly perpendicular to the horizontal axis B and may be off by a few degrees of freedom) such that each one of the probes 135a-n is moveable along the linear axis A relative to one another. As used herein, unless otherwise indicated, substantially horizontal, substantially vertical, substantially parallel, and substantially perpendicular can mean any orientation within three degrees, inclusively, of horizontal, vertical, parallel, and perpendicular, respectively.

The probe assemblies 134a-n may each include one or more probes 135a-n that are configured to scan and/or inspect a structure 140, e.g., an interior and/or exterior surface of a structure 140. Within examples, each one of the probes 135a-n is configured to inspect different structural features of a structure 140. For instance, one probe of the probes 135a-n (e.g., probe 135n) may be configured for inspecting portions of a structure 140 that includes joggles and a different one of the probes 135a-n (e.g., probe 135a) may be configured to inspecting substantially even surfaces of the structure 140. The probes 135a-n may be rotatable, with passive springs or with actuators, along a radial axis C (e.g., rotatable about a z-axis) and/or along a radial axis D (e.g., rotatable about an x-axis) to account for variations in the structure surface as the probes 135a-n are scanning the structure 140.

Figure 4B:
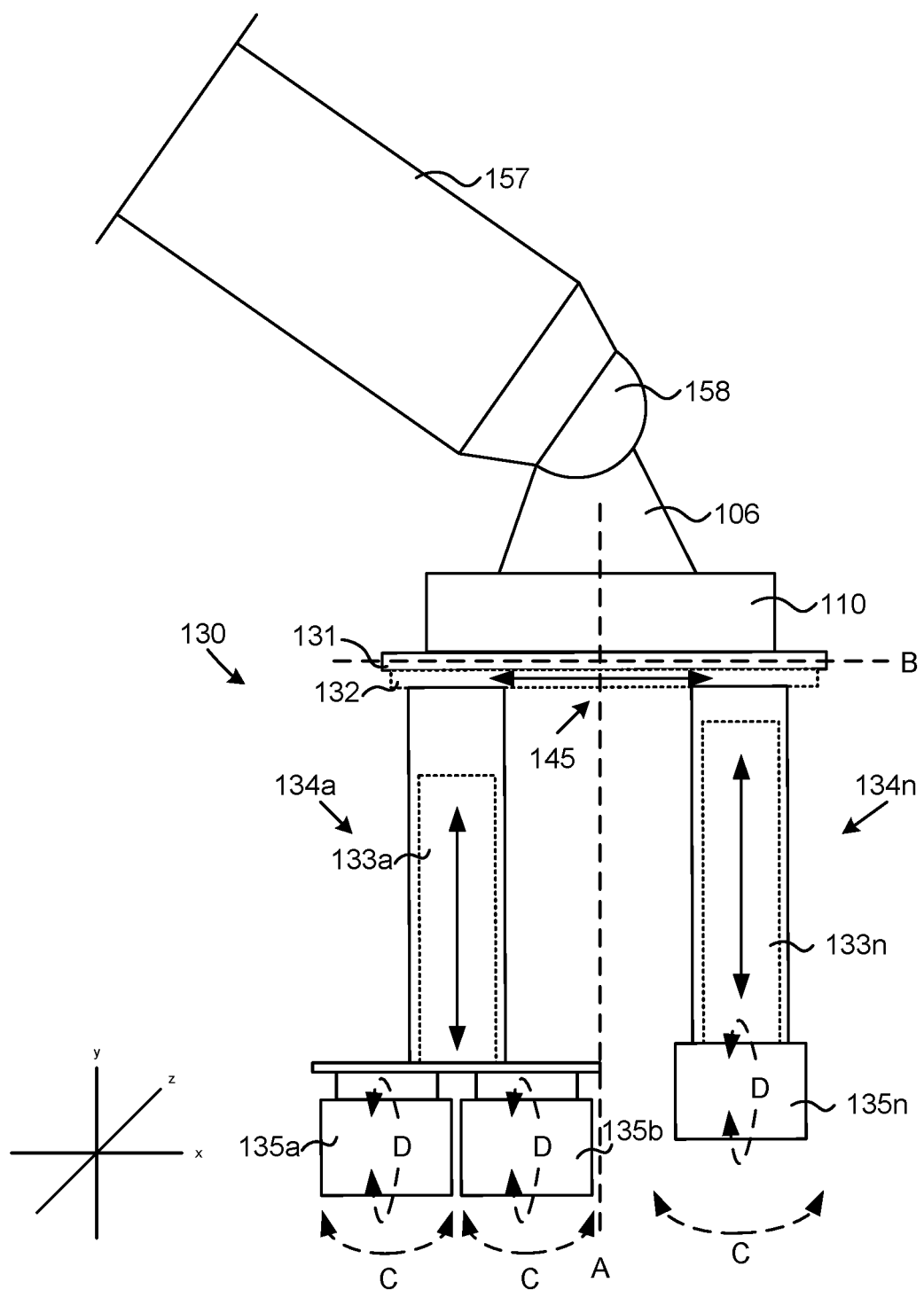
FIG. 4b is a schematic perspective view of an implementation of an inspection tool assembly of a multi-probe non-destructive inspection system, according to one or more examples of the present disclosure.

Referring to FIG. 4b, according to some examples, disclosed herein is an inspection tool assembly 130 coupled to a tool assembly 110, as described above with reference to FIG. 3. The inspection tool assembly 130 depicted in FIG. 4b may be substantially similar to the inspection tool assembly 130 described above and depicted in FIG. 4a.

The inspection tool assembly 130 depicted in FIG. 4b, according to some examples, includes a probe assembly 134a that includes a plurality of probes 135a-b. The plurality of probes 135a-b, in one example, are configured to scan the structure 140 simultaneously, at substantially the same time, and/or the like while the probe assembly 134a is in a scanning position.

In further examples, the plurality of probes 135a-b are positioned in-line or even with one another (e.g., along an x-, y-, and/or z-axis). In other examples, the plurality of probes 135a-b are offset from one another (e.g., along an x-, y-, and/or z-axis). In such an example implementation, at least one of the plurality of probes 135a-b overlaps a different one of the plurality of probes 135a-b such that areas of the surface of the structure 140 that are beneath the overlapping portions of the plurality of probes 135a-b are scanned more than one time.

Further, even though two probes 135a-b are depicted in FIG. 4b as being coupled to a single probe assembly 134a, the probe assembly 134a may include any number of probes 135a-b. For instance, in an example, the probe assembly 134a includes three probes 135. In another example, the probe assembly 134a includes four probes 135, and so on.

Referring to FIGS. 5a and 5b, according to some examples, disclosed herein is an inspection tool assembly 130 coupled to a tool assembly 110, as described above with reference to FIG. 3. The inspection tool assembly 130, in certain embodiments, includes various components or features of the inspection tool assembly 130 described above with reference to FIGS. 4a and 4b.

In the illustrated example embodiments, the inspection tool assembly 130 includes a radial actuator 142 that is configured to rotate about radial axis E (e.g., about a z-axis). In certain embodiments, the radial actuator 142 is shaped as a sphere and is configured to rotate three-dimensionally (e.g., about each of the x-, y-, and z-axes). In some implementations, a motion platform 102 may be a six-axis robot such that positioning the probe 135a-n in a scanning position comprises a combination of the six axes of the robot. The probe assemblies 134a-n may be non-movably fixed to the inspection tool assembly 130 (e.g., either to a second linear actuator 132 or a base structure 131) and are offset or spaced apart from one another by a certain angle, degree, distance, or the like such that when one probe of the probe assemblies 134a-n is in a scanning position, the other probe assembly/assemblies 134a-n is/are not in the scanning position.

As shown in FIG. 5a, the radial actuator 142 is rotated about a radial axis E to position a probe assembly 134n in a scanning position along the vertical axis A, which passes through the probe assembly 134n, and to position the other probe assembly 134a in a non-scanning position. Furthermore, as shown in FIG. 5b, the radial actuator 142 is rotated about a radial axis E to position a probe assembly 134a in a scanning position along the vertical axis A, which passes through the probe assembly 134a, and to position the other probe assembly 134n in a non-scanning position. In some example embodiments, the inspection tool assembly 130 includes a second linear actuator 132 to further adjust or move the probe assemblies 134a-n along a linear axis B and into a scanning position. In other example embodiments, each one of the probe assemblies 134a-n includes a linear actuator 133a-n to adjust or move the probes 135a-n along a linear axis A and into or out of a scanning position.

Figure 6A:
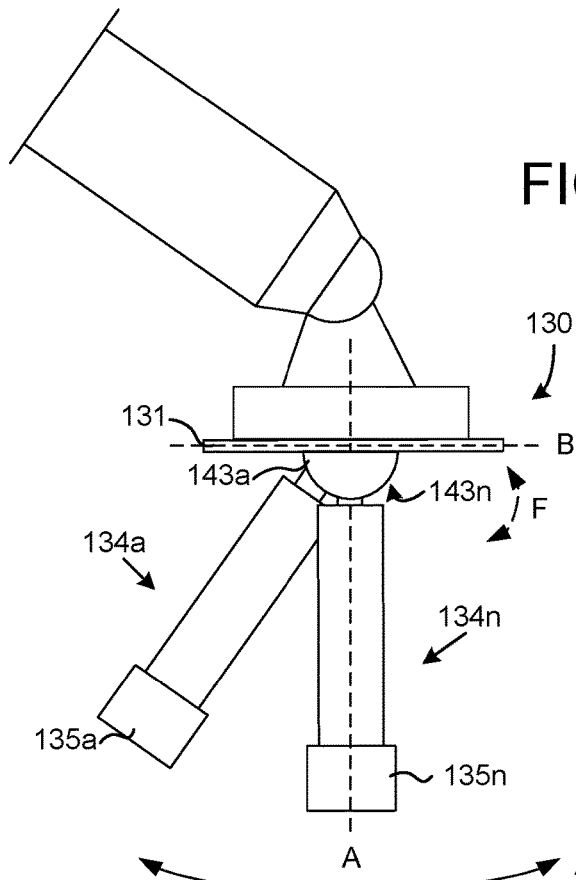
FIG. 6a is a schematic perspective view of an implementation of another inspection tool assembly of a multi-probe non-destructive inspection system in a first position, according to one or more examples of the present disclosure.
Figure 6B:
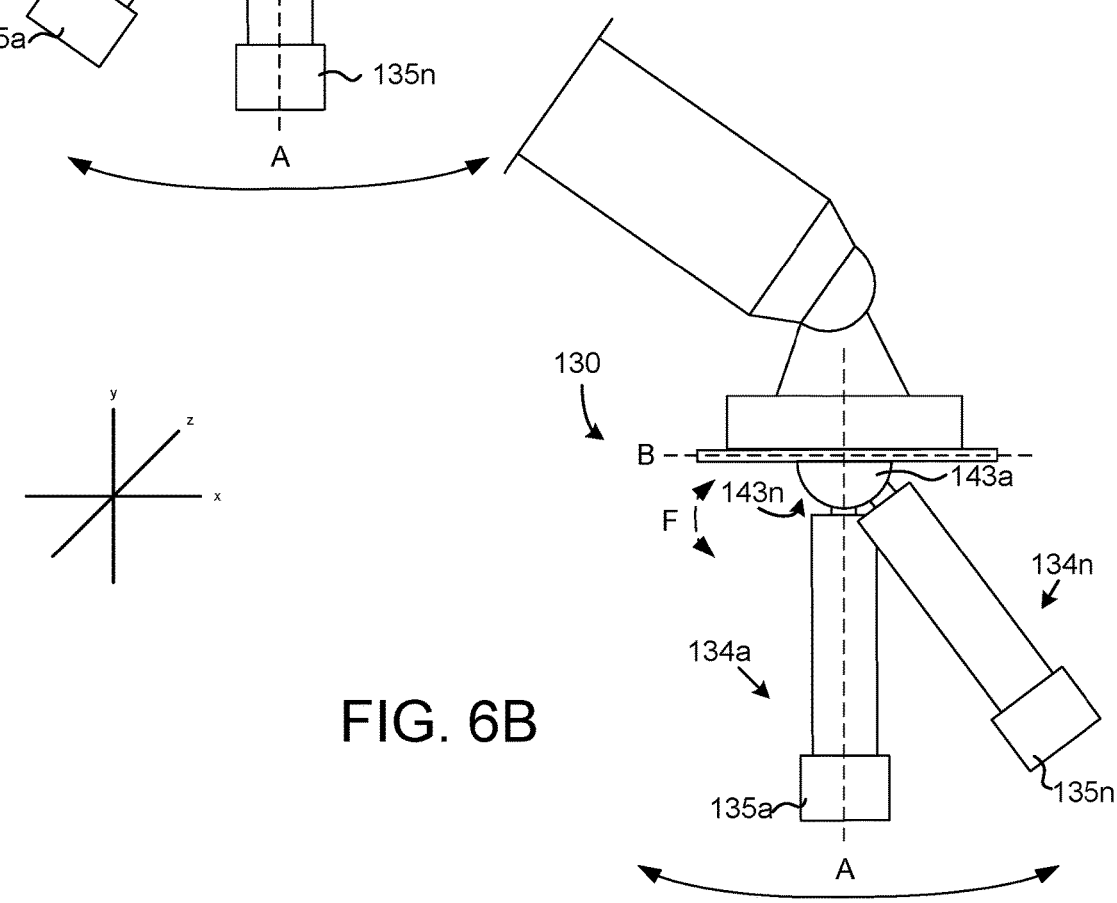
FIG. 6b is a schematic perspective view of the inspection tool assembly of FIG. 6a in a second position, according to one or more examples of the present disclosure.

Referring to FIGS. 6a and 6b, according to some examples, disclosed herein is an inspection tool assembly 130 coupled to a tool assembly 110, as described above with reference to FIG. 3. The inspection tool assembly 130, in certain embodiments, includes various components or features of the inspection tool assembly 130 described above with reference to FIGS. 4a and 4b.

In the illustrated example embodiments, the inspection tool assembly 130 includes radial actuators 143a-n that are each coupled to a corresponding one of the probe assemblies 134a-n and are each configured to rotate about radial axis F (e.g., about a z-axis). In certain embodiments, the radial actuators 143a-n are shaped as spheres and are configured to rotate three-dimensionally (e.g., about each of the x-, y-, and z-axes). The probe assemblies 134a-n may be non-movably fixed to the radial actuators 143a-n, which may be used to position the probe assemblies 134a-n into and out of a scanning position.

As shown in FIG. 6a, a radial actuator 143n coupled to one of the probe assemblies 134n is rotated about a radial axis F to position the probe assembly 134n in a scanning position along the vertical axis A, which passes through the probe assembly 134n. Another radial actuator 143a that is coupled to another probe assembly 134a is rotated about a radial axis F to position the probe assembly 134a out of a scanning position. Furthermore, as shown in FIG. 6b, the radial actuator 143n coupled to one of the probe assemblies 134n is rotated about a radial axis F to position the probe assembly 134n out of the scanning position and the other radial actuator 143a that is coupled to another probe assembly 134a is rotated about a radial axis F to position the probe assembly 134a in the scanning position along the vertical axis A, which passes through the probe assembly 134a.

In some example embodiments, the inspection tool assembly 130 includes a second linear actuator 132 to further adjust or move the probe assemblies 134a-n along a linear axis B and into a scanning position. In other example embodiments, each probe assembly 134a-n includes at least one of the linear actuators 133a-n to adjust or move the probes 135a-n along a linear axis A and into or out of a scanning position. In one example embodiment, the inspection tool assembly 130 further includes a radial actuator 142, as described above with reference to FIGS. 5a and 5b to further adjust or move the probes 135a-n into and out of the scanning position.

Figure 7:
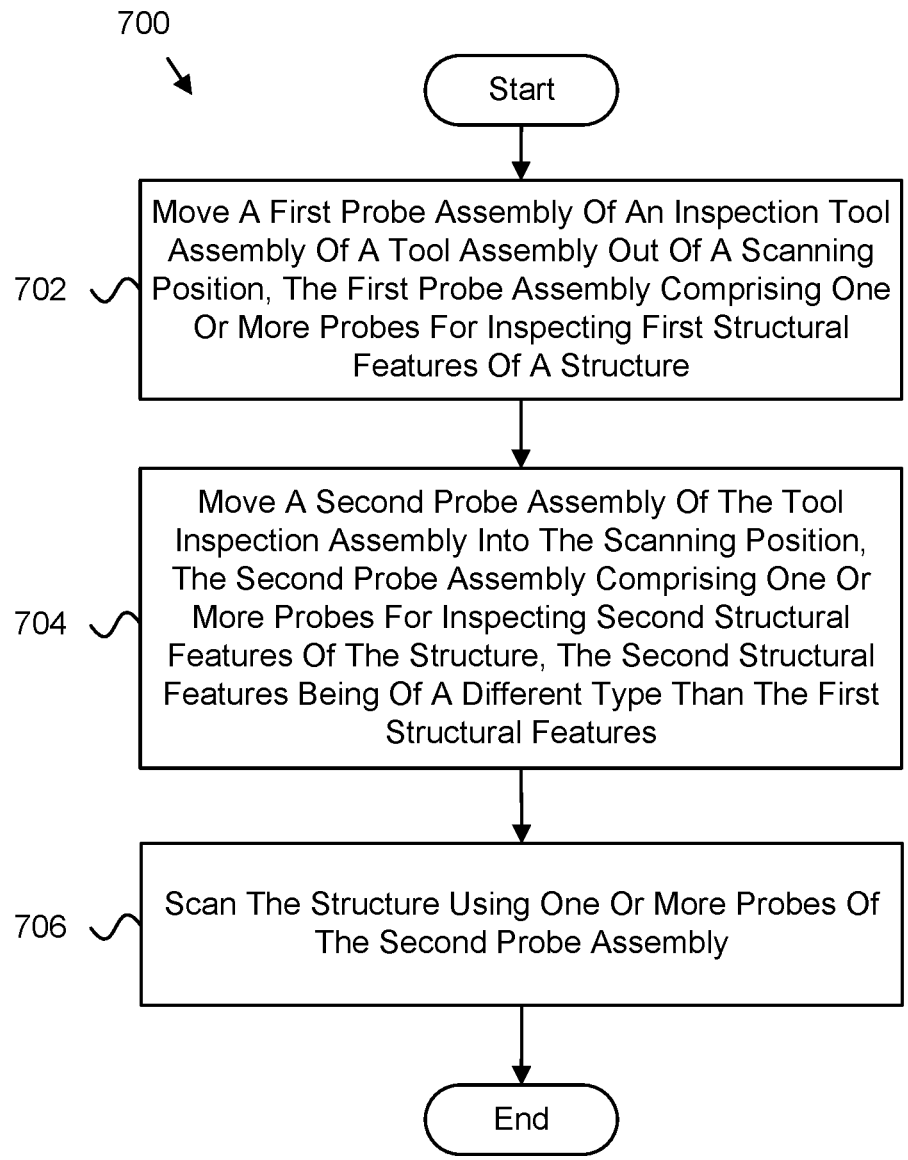
FIG. 7 is a schematic flow diagram of a method of scanning a structure using a multi-probe non-destructive inspection system, according to one or more examples of the present disclosure.

Referring to FIG. 7, according to some examples, disclosed herein is a method 700 for operating a multi-probe non-destructive inspection system. The method 700 begins and moves 702 a first probe assembly 134a of an inspection tool assembly 130 of a tool assembly 110 out of a scanning position. The first probe assembly 134a includes one or more probes 135a for inspecting first structural features of a structure 140.

The method 700 moves 704 a second probe assembly 134n of the inspection tool assembly 130 into the scanning position. The second probe assembly 134n includes one or more probes 135n for inspecting second structural features of the structure 140. The second structural features are of a different type than the first structural features. The method 700 scans 706 the structure using one or more probes 135n of the second probe assembly 135n, and the method 700 ends.

In an example, moving the second probe assembly 134n of the inspection tool assembly 130 into the scanning position involves moving the second probe assembly 134n relative to the first probe assembly 134a. In another example, moving the second probe assembly 134n into the scanning position involves actuating a radial actuator coupled to the inspection tool assembly about a radial axis, where the first probe assembly 134a and the second probe assembly 134n are non-movably fixed to the inspection tool assembly and are offset from each other.

In accordance with an aspect of the present disclosure, an inspection tool assembly is provided. The inspection tool assembly includes (i) a base structure configured to be coupled to a tool assembly and (ii) a plurality of probe assemblies coupled to the base structure. Each probe assembly comprises a first linear actuator and a probe, different from the probe of any other one of the plurality of probe assemblies, for inspecting a different structural feature of a structure, wherein each probe is moveable, along a first axis relative to another one of the probes and substantially perpendicular to the base structure, using the first linear actuator of the corresponding one of the plurality of probe assemblies. In an example, the inspection tool assembly corresponds to inspection tool assembly 130, and the tool assembly corresponds to tool assembly 110.

In accordance with an aspect of the present disclosure, a tool assembly is provided. The tool assembly is configured to be coupled to a motion platform such that the tool assembly is movable relative to the motion platform. The tool assembly includes an inspection tool assembly including (i) a base structure coupled to the tool assembly and (ii) a plurality of probe assemblies coupled to the base structure. Each probe assembly comprises a first linear actuator and a probe, different from the probe of any other one of the plurality of probe assemblies, for inspecting a different structural feature of a structure, wherein each probe is moveable, along a first axis relative to another one of the probes and substantially perpendicular to the base structure, using the first linear actuator of the corresponding one of the plurality of probe assemblies. In an example, the tool assembly corresponds to tool assembly 110, the motion platform corresponds to motion platform 102, and the inspection tool assembly corresponds to inspection tool assembly 130.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the various modules may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The modules may be implemented as a hardware circuit comprising custom very-large-scale integration (VLSI) circuits or gate arrays, off-the-shelf semiconductors such as logic chips, transistors, or other discrete components. The modules may also be implemented in programmable hardware devices such as field programmable gate arrays, programmable array logic, programmable logic devices or the like.

The modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the modules. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A non-destructive inspection system, comprising:
a motion platform; and
a tool assembly, coupled to the motion platform such that the tool assembly is movable relative to the motion platform, wherein the tool assembly comprises an inspection tool assembly, the inspection tool assembly comprising:
   a base structure coupled to the tool assembly; and
   a plurality of probe assemblies coupled to the base structure, each probe assembly comprising a first linear actuator and a probe, different from the probe of any other one of the plurality of probe assemblies, for inspecting a different structural feature of a structure, wherein each probe is moveable, along a first axis relative to another one of the probes and substantially perpendicular to the base structure, using the first linear actuator of the corresponding one of the plurality of probe assemblies.

2. The non-destructive inspection system according to claim 1, wherein:
the inspection tool assembly further comprises a second linear actuator coupled to the base structure and each of the plurality of probe assemblies; and
the second linear actuator is configured to move the plurality of probe assemblies along a second axis substantially perpendicular to the first axis.

3. The non-destructive inspection system according to claim 2, further comprising a controller, configured to actuate the first linear actuators to position one of the plurality of probes into a scanning position and to position the other probes into a non-scanning position.

4. The non-destructive inspection system according to claim 3, wherein:
the first axis passes through a reference point of the tool assembly;
the one of the plurality of probe assemblies in the scanning position is aligned with the reference point such that the first axis passes through the one of the plurality of probe assemblies; and
the other probe assemblies in the non-scanning position are not aligned with the reference point such that the first axis does not pass through the other probe assemblies.

5. The non-destructive inspection system according to claim 3, wherein:
the first axis passes through a reference point of the tool assembly; and
an offset of the position of the one of the plurality of probe assemblies, that is positioned in the scanning position, relative to the reference point is determined for scanning.

6. The non-destructive inspection system according to claim 1, wherein each probe of the plurality of probe assemblies is rotatable about a first radial axis, parallel to the first axis, and is rotatable about a second radial axis, substantially perpendicular to the first axis and the first radial axis.

7. The non-destructive inspection system according to claim 1, wherein:
a probe assembly of the plurality of probe assemblies comprises a plurality of probes; and
while at least another of the plurality of probe assemblies is in a non-scanning position, the plurality of probes are configured to scan the structure simultaneously when the probe assembly is in a scanning position.

8. The non-destructive inspection system according to claim 1, further comprising one or more sensors, wherein a probe assembly of the plurality of probe assemblies is selected to be in a scanning position and another probe assembly of the plurality of probe assemblies is selected to be in a non-scanning position based on data about the structure captured using the one or more sensors.

9. The non-destructive inspection system according to claim 1, wherein the plurality of probe assemblies comprises a first probe assembly that comprises a first probe for scanning substantially even areas of the structure and a second probe assembly that comprises a second probe for scanning uneven areas of the structure.

10. A method of scanning a structure using the non-destructive inspection system of claim 1, the method comprising:

moving a first probe assembly of the plurality of probe assemblies of the inspection tool assembly out of a scanning position, the probe of the first probe assembly is configured to inspect first structural features of a structure;

moving a second probe assembly of the plurality of probe assemblies of the inspection tool assembly into the scanning position, the probe of the second probe assembly is configured to inspect second structural features of the structure, the second structural features being of a different type than the first structural features; and scanning the structure using the probe of the second probe assembly.

11. The method according to claim 10, wherein:

the step of moving the first probe assembly out of the scanning position comprises actuating the first linear actuator coupled to the first probe assembly, along the first axis in a first direction; and the step of moving the second probe assembly into the scanning position comprises actuating the first linear actuator coupled to the second probe assembly, along the first axis in a second direction opposite the first direction.

12. The method according to claim 11, further comprising actuating a second linear actuator, coupled to the first probe assembly and the second probe assembly, along a second axis, substantially perpendicular to the first axis, to further move the first probe assembly out of the scanning position and the second probe assembly into the scanning position.

13. The method according to claim 12, wherein:

the first axis passes through a reference point of the tool assembly; and the first axis passes through the second probe assembly when in the scanning position.

14. The method according to claim 12, further comprising determining an offset of the scanning position of the second probe assembly along the second axis in relation to a reference point of the tool assembly.

15. The method according to claim 10, wherein moving the first probe assembly out of the scanning position and moving the second probe assembly into the scanning position further comprises actuating a radial actuator coupled to the inspection tool assembly about a radial axis, where the first probe assembly and the second probe assembly are non-movably fixed to the inspection tool assembly and are offset from each other.

16. The method according to claim 10, wherein moving the first probe assembly out of the scanning position and moving the second probe assembly into the scanning position further comprises actuating a first radial actuator coupled to the first probe assembly and actuating a second radial actuator coupled to the second probe assembly.

17. The method according to claim 10, further comprising dynamically selecting one of the first probe assembly or the second probe assembly to move into the scanning position based on structural features of the structure to be inspected, the probe of the first probe assembly and the probe of the second probe assembly.

18. The method according to claim 10, further comprising:

receiving a plurality of data sets, at a computing device, that the probe of the first probe assembly and the probe of the second probe assembly capture, the plurality of data sets describing various structural features of the structure; and generating a single scan of the structure based on the plurality of data sets.

19. A non-destructive inspection system, comprising:

a motion platform; and a tool assembly, coupled to the motion platform such that the tool assembly is movable relative to the motion platform, wherein the tool assembly comprises an inspection tool assembly that comprises a base structure and a plurality of probe assemblies coupled to the base structure, each probe assembly comprising a first linear actuator and a probe, different from the probe of any other one of the plurality of probe assemblies, for inspecting a different structural feature of a structure, wherein each probe is moveable, along a first axis relative to another one of the probes and substantially perpendicular to the base structure, using the first linear actuator of the corresponding one of the plurality of probe assemblies;

wherein the plurality of probe assemblies is rotatable about an axis using at least one radial actuator to move at least one of the plurality of probe assemblies into a scanning position.

20. The non-destructive inspection system according to claim 19, wherein the at least one radial actuator is one of:

coupled to the inspection tool assembly to move the inspection tool assembly in a radial direction; or a plurality of radial actuators each coupled to a corresponding one of the plurality of probe assemblies to individually move each of the plurality of probe assemblies in a radial direction.

* * * * *